April 23, 1940.  H. P. PHILLIPS  2,197,983
PISTON RING
Filed Nov. 4, 1938
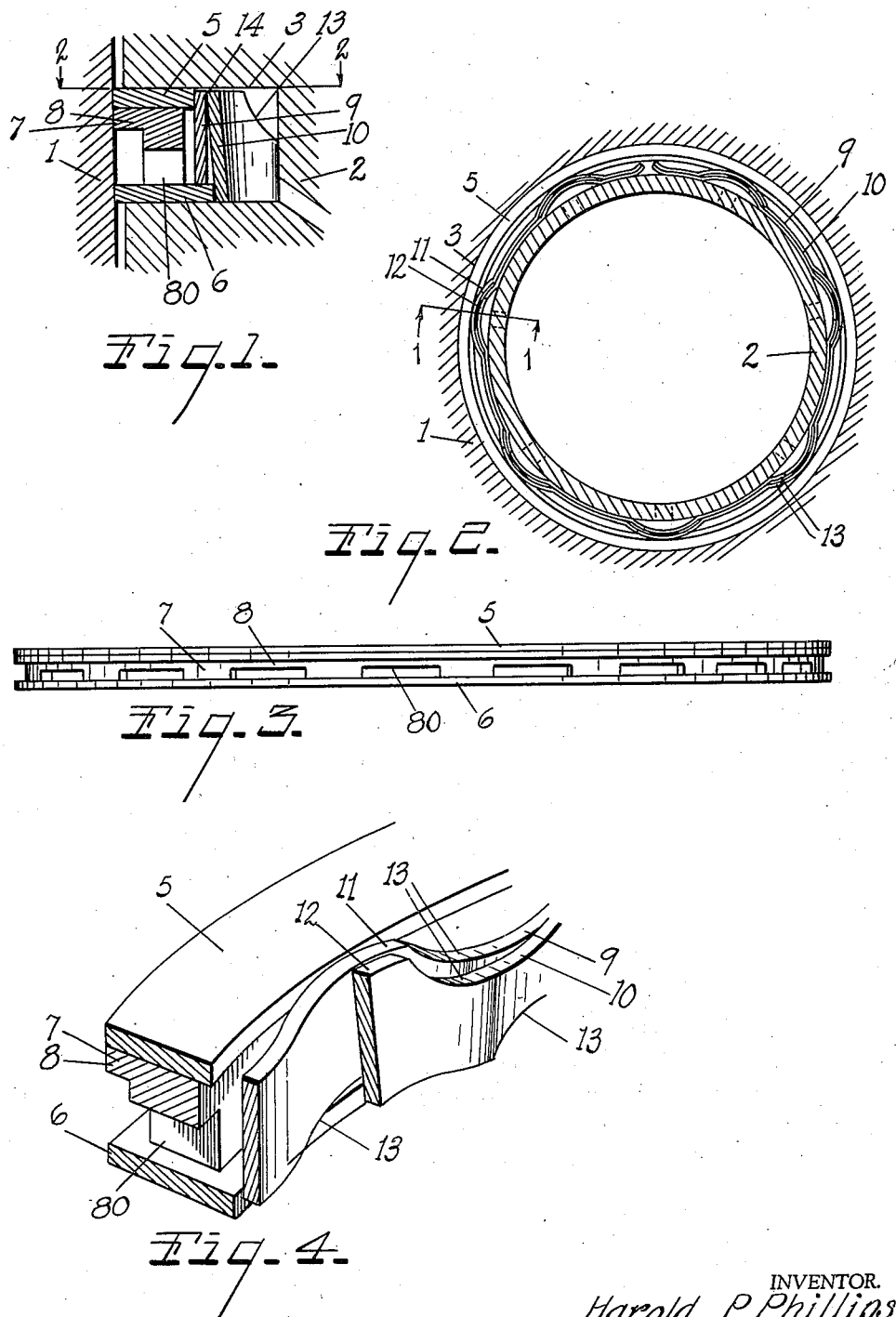
INVENTOR.
Harold P. Phillips
BY Earl & Chappell
ATTORNEYS Patented Apr. 23, 1940

2,197,983

UNITED STATES PATENT OFFICE 2,197,983

PISTON RING

Harold P. Phillips, Hastings, Mich., assignor to Hastings Manufacturing Company, Hastings, Mich.

Application November 4, 1938, Serial No. 238,717

4 Claims. (Cl. 309—45)

This invention relates to improvements in piston rings.

The main objects of my invention are:

First, to provide a novel composite piston ring characterized by a plurality of cylinder wall contacting sections each having independent radial movement of expansion and contraction in sealing engagement with the cylinder wall.

Second, to provide a piston ring assembly including a plurality of cylinder wall contacting portions, an axial spacer therefor, and means for independently controlling the radial action of said portions.

Third, to provide a composite ring or assembly of the type described which is simple in design and economical of construction.

Fourth, to provide a composite oil ring of the type described insuring a full cylinder wall contact at all times and a high unit pressure yet having a low total wall tension so as to minimize total cylinder wall drag.

Fifth, to provide a composite ring of the type described including a plurality of wall contacting portions and inner means for expanding the same wherein the wear on the expanding means is minimized.

Further objects relating to details and economies of my invention will definitely appear from the description to follow. The invention is defined in the claims.

A structure embodying the features of my invention is illustrated in the accompanying drawing, wherein:

Fig. 1 is a fragmentary view in section on line 1—1 of Fig. 2, illustrating the assembly of my invention in operative relation to a piston and cylinder wall, the size of the parts being greatly magnified for clarity of illustration.

Fig. 2 is a fragmentary view in section on line 2—2 of Fig. 1, illustrating the cylinder and piston and details of construction and arrangement of my assembly.

Fig. 3 is a side view illustrating the composite ring of my invention.

Fig. 4 is an enlarged fragmentary perspective view further illustrating the relation of the parts.

The present invention relates to improvements in the composite piston ring described and claimed in my copending application Serial No. 74,654, filed April 16, 1936 now Patent Number 2,148,997 of February 28, 1939. That application describes a composite piston ring having a plurality of steel wall contacting segments or rings, an intermediate spacer therefor, and means in the form of a crimped inner annular spring or expander for thrusting the steel sections outwardly into engagement with the cylinder wall. By such a structure, the unit cylinder wall pressure was maintained high to insure an effective cylinder contact action. The present invention improves in some respects the results obtainable by a multiple section ring such as referred to above, by providing means for producing a more complete independent expansion and contraction of the rings or segments relative to the cylinder wall in accordance with irregularities of the latter, likewise with provision for still further minimizing the wear occurring between the steel outer segments and the inner expanding spring or ring.

Referring to the drawing, wherein no attempt has been made to portray the relative dimensions of the parts exactly, the reference numeral 1 indicates a cylinder and the reference numeral 2 a piston working therein and provided with the usual annular ring groove 3. The reference numeral 4 designates in general the composite ring of my invention, which consists of a pair of thin steel circular segments or rings 5, 6 the former of which is of somewhat less radial thickness than the latter. These elements 5 and 6 may be practically formed of ribbon steel. The rings 5, 6 are in edge contact with the cylinder wall and are spaced by a spacer 7, preferably cast iron, having a preferably relatively narrow annular radially extending cylinder wall contacting and locating portion 8 and provided with radial drainage openings 80 spaced circumferentially around the bottom edge thereof. The piston is provided with suitable ports for the drainage of oil from groove 3. In the preferred construction, both of the ribbon-like cylinder contacting sections or elements are of greater radial thickness than the spacer 7.

For the purpose of urging the steel cylinder wall contacting sections 5, 6 radially outwardly into effective engagement with the cylinder wall, I provide a pair of inner expanding members or springs 9, 10, the former of which is of substantially less axial width than the latter, which is of a width substantially equal to the axial width of the groove 3. The outermost spring 9, it will be observed, engages the element 5 only and the innermost section 10 engages element 4 only, with the result that an independent expansion and contraction of the said elements 5, 6 occurs during operation.

The expanders or spring rings 9, 10 are provided with suitable ring contacting crimps 11, 12 respectively, which crimps are in angular register, as illustrated in Fig. 2, and the springs 9, 10 are further provided with recesses 13 to permit free drainage of the oil. In the illustrated embodiment, the annular cylinder contacting portion 8 on spacer 11 is of sufficient thickness to engage the cylinder wall and afford effective engagement thereof, which adds to the effectiveness of the composite ring, particularly during the wearing-in stage. In the preferred embodiment, the outermost inner spring 9 will be greater in circumference than the innermost spring 10 by an amount equal to 2 times 3.1416 times the radial thickness of the outer ring.

By the above described construction, I provide a composite ring wherein the individual wall contacting sections thereof have independent movements, notwithstanding the fact that the inner springs 9, 10 contact one another at certain points 14, and it is thus insured that at all times there is a full engagement of a steel section with the periphery of the cylinder wall, regardless of the many minute waves and shoulders which are often present in worn cylinders. Furthermore, the wear between steel sections 5, 6 and the respective inner springs 9, 10 is distributed over two inner springs, being limited to a single narrow area on each, with the result that wear on the crimps 11, 12 therein is materially reduced; i. e., only one steel section is in wearing relation to the crimps of a given inner spring and accordingly inner ring wear is cut in half, compared to a construction in which a single inner ring bears the wear of both steel sections. Although I have shown the inner spacer 7 as extending outwardly to the cylinder wall, it will be understood that variations in design are permissible in this respect; that is, the spacer may be out of contact with the cylinder wall. If desired, it may be designed so that it is of even greater radial dimension than the steel rings to thereby effect a greater thrust outwardly against the wall.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A composite piston ring for an internal combustion engine, comprising a pair of thin ribbon-like split cylinder wall contacting sections, a spacer therebetween, said sections being of different radial thickness, and a pair of thin split annular inner expanding springs in radial thrust engagement with said sections, one of said springs being of less axial thickness than the other and being arranged for engagement with the section of less radial thickness only, the other spring engaging the section of greater radial thickness only, whereby independent radial action of the sections is produced and wear between the sections and springs is minimized.

2. In combination, a piston having an annular groove therein, and a piston ring assembly in said groove, said assembly comprising a pair of annular ribbon-like steel sections in said groove adapted for radial thrust engagement with a cylinder wall, said sections being of different radial thickness, a spacer between said sections, said spacer having radial oil drainage recesses therein and being provided with an annular cylinder wall engaging portion, and a pair of inner expanding springs in said groove, one of said springs being approximately equal in width to the axial dimension of the groove and the other spring being of substantially less width than said first spring, the narrower spring resting on the section of greater radial thickness and radially engaging the section of less radial thickness, the first named spring radially engaging the section of greater radial thickness, said spacer being out of contact with said springs.

3. A composite piston ring for an internal combustion engine, comprising a pair of thin ribbon-like split cylinder wall contacting sections of steel, a spacer of relatively soft material disposed between said sections to maintain the same in axially spaced relation, said spacer including a cylinder wall engaging portion, and a pair of independent annular split expanding springs disposed behind said sections, each spring acting radially on a different section independently of the other whereby to be capable of exerting different expanding effects on the respective sections proportioned as desired and thereby secure independent radial action of the sections, said springs being out of engagement with the spacer.

4. A composite piston ring for an internal combustion engine, comprising a pair of thin ribbon-like split cylinder wall contacting sections of steel, a spacer of relatively soft material disposed between said sections to maintain the same in axially spaced relation, said spacer including a cylinder wall engaging portion, and a pair of independent annular split expanding springs disposed behind said sections, each spring acting radially on a different section independently of the other whereby to be capable of exerting different expanding effects on the respective sections proportioned as desired and thereby secure independent radial action of the sections.

HAROLD P. PHILLIPS.